United States Patent
Bridge et al.

(10) Patent No.: US 6,357,408 B1
(45) Date of Patent: Mar. 19, 2002

(54) SYSTEM AND METHOD FOR ELIMINATING POCKET SPARKING IN AN INTERNAL COMBUSTION ENGINE

(75) Inventors: Matthew L. Bridge, Pleasant Prairie, WI (US); Gregory J. Binversie, Grayslake, IL (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/540,817

(22) Filed: Mar. 31, 2000

(51) Int. Cl.⁷ .............................................. H01T 13/20
(52) U.S. Cl. .................... 123/169 PH; 123/169 PA; 313/143
(58) Field of Search .................... 123/195 HC, 196 W, 123/298, 305, 169 CA, 169 E, 169 PA, 169 PH; 313/130, 143, 325

(56) References Cited

U.S. PATENT DOCUMENTS

| | | | | |
|---|---|---|---|---|
| 4,211,952 A | * | 7/1980 | Iwata et al. .................. | 313/143 |
| 4,491,101 A | * | 1/1985 | Strumbos ..................... | 313/143 |
| 4,514,657 A | * | 4/1985 | Igashira et al. .............. | 313/130 |
| 4,924,829 A | * | 5/1990 | Cheng et al. ................ | 313/143 |
| 5,477,104 A | * | 12/1995 | Tanabe et al. ............... | 313/143 |
| 5,508,582 A | * | 4/1996 | Sugimoto et al. ............ | 313/143 |
| 6,130,498 A | * | 10/2000 | Shimizu et al. .............. | 313/143 |
| 6,170,458 B1 | * | 1/2001 | Miller ......................... | 123/295 |
| 6,176,215 B1 | * | 1/2001 | Baur et al. ................... | 123/295 |

* cited by examiner

Primary Examiner—Erick Solis
(74) Attorney, Agent, or Firm—Fletcher, Yoder & Van Someren

(57) ABSTRACT

A fuel injected, internal combustion engine that is protected from detrimental ignition due to pocket sparking. The engine includes one or more cylinders into which fuel is injected by an injector. A spark plug is used to ignite the fuel-air mixture within the cylinder. The spark plug is designed with a base and a shell extending from the base to define a hollow interior. A central electrode is disposed in an insulative core and extends through the hollow interior of the shell. The shell is connected to a secondary electrode. A gap is formed between the electrodes for promulgation of a spark to ignite the fuel-air mixture. The detrimental effects of pocket sparking are eliminated by placing a closure member between a terminal end of the shell and the nose of the insulative core. This closure member may be in the form of a lip that extends from the shell into proximity with the nose of the insulative core.

42 Claims, 3 Drawing Sheets

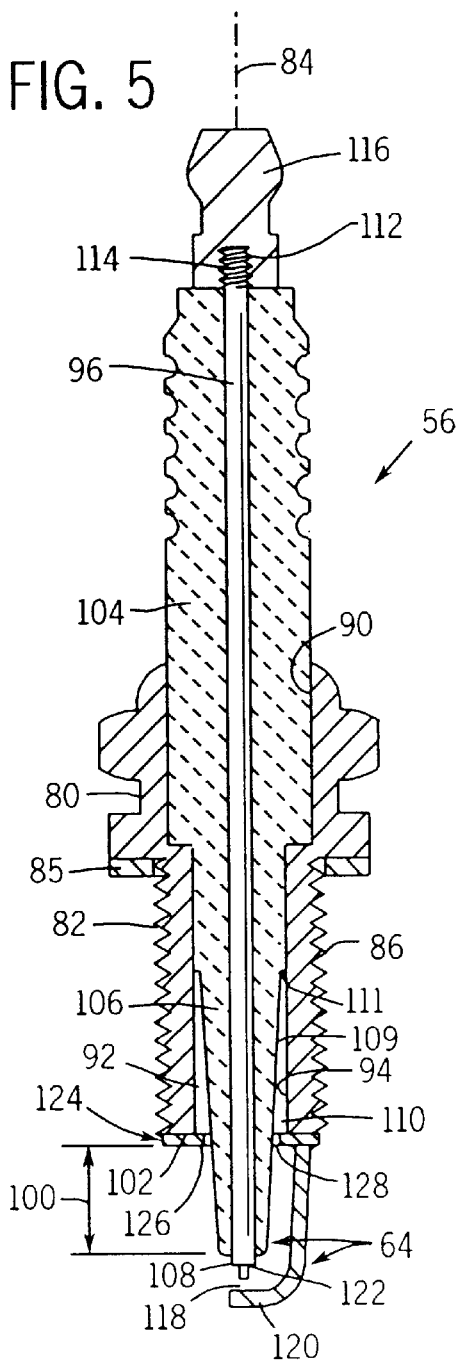
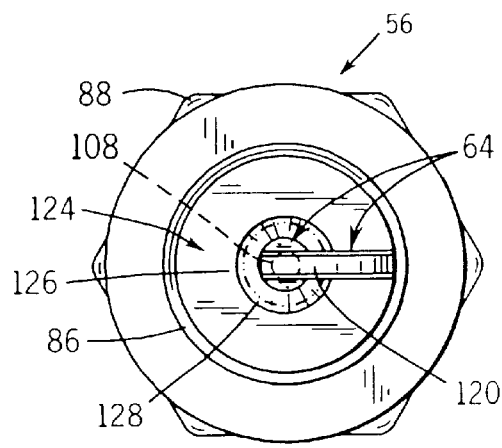

SYSTEM AND METHOD FOR ELIMINATING POCKET SPARKING IN AN INTERNAL COMBUSTION ENGINE

FIELD OF THE INVENTION

The present invention relates generally to a system and method for improving the ignition characteristics of certain internal combustion engines, and particularly to a system and method for reducing pocket sparking at the spark plug (or plugs) used in an engine, such as a direct fuel injected two-stroke engine.

BACKGROUND OF THE INVENTION

Internal combustion engines generally have one or more cylinders through which one or more pistons move in a reciprocating manner. Each piston is connected to a crankshaft by a connecting rod which delivers force from the piston to the crankshaft to rotate the crankshaft. Power to drive the piston is provided by igniting a fuel-air mixture disposed in the cylinder on a side of the piston opposite the connecting rod. The fuel-air mixture is ignited by some type of ignition device, such as a spark plug.

A conventional spark plug includes a base to which a mounting shell is attached. Typically, the mounting shell includes external threads that are threadably engaged with a corresponding spark plug opening in the engine. The spark plug typically includes an insulative core that extends through the base and into the interior of the mounting shell. A nose of the insulative core extends into the mounting shell and tapers inwardly, creating an annular space or pocket between the core nose and the interior surface of the mounting shell.

A central electrode extends axially through the insulative core such that it has an exposed tip on the mounting shell side of the insulative core. On an opposite side of the insulative core, the electrode has a connecting end designed for connection to the engine's ignition system. The ignition system provides sufficient electrical energy to create a spark at the electrode tip.

Typically, the spark is created between the electrode tip and a second electrode that is electrically connected to the mounting shell, and thereby grounded to the motor. Upon sufficient input from the ignition system, electricity arcs between the electrode tip and the secondary electrode, thereby creating the spark that ignites the fuel-air mixture within the cylinder.

In certain engine applications, the central electrode tip and the core nose become coated with deposits, such as carbon deposits. This can result in the electrical charge traveling along the deposits and jumping to the mounting shell at the base of the pocket formed between the insulative core nose and the mounting shell. When this "pocket spark" ignites the fuel-air mixture in the pocket, a late combustion or a slow traveling flame front results and leads to late combustion of the fuel-air mixture in the combustion chamber. The late combustion reduces the power of the engine and often results in a detrimental effect, known as "knocking". This problem is particularly pronounced in fuel injected engines in which the spark plug electrodes are located directly within the fuel spray injected into a given cylinder.

It would be advantageous to provide a system and methodology for preventing ignition of the fuel-air mixture at the base of the core nose due to pocket sparking.

SUMMARY OF THE INVENTION

The present invention features a fuel injected, two-stroke engine system designed to prevent undesirable ignition characteristics. The system includes a two-stroke engine having an internal combustion chamber defined by a wall. A fuel injector is mounted to the engine and extends through the wall into communication with the internal combustion chamber. The injector is designed to discharge a fuel spray into the internal combustion chamber. A spark plug also is placed in communication with the internal combustion chamber. The spark plug includes a base and a shell extending from the base. The shell defines a hollow interior and is coupled to a first electrode, such as a J-type electrode. A second electrode extends through at least a portion of the hollow interior and is surrounded by an insulating layer. A closure member extends from the shell into proximity with the insulating layer to substantially enclose the pocket formed between the interior surface of the shell and the exterior surface of the insulating layer.

According to another aspect of the present invention, a spark plug has been designed to reduce pocket sparking. The spark plug includes a base and an insulative core disposed through the base. The insulative core includes a core nose extending axially outwardly from the base. An electrode is disposed within the insulative core and includes a tip exposed at a distal end of the core nose. Additionally, a shell is connected to the base and includes a terminal end that encircles the core nose. The terminal end is less distant from the base of the spark plug than the distal end of the core nose. In other words, the core nose extends beyond the shell. Furthermore, a second electrode is coupled to the shell such that a spark can be created across the gap between the first and the second electrodes. Additionally, a lip extends inwardly from the terminal end towards the core nose to substantially enclose the pocket formed between the core nose and the shell, thus preventing pocket sparking.

According to another aspect of the present invention, a method is provided for reducing undesirable ignition characteristics in a fuel injected engine. The method includes injecting a fuel into a cylinder of an engine and igniting the fuel with a spark plug. The spark plug is of the type having an electrode surrounded by a mounting shell that forms a pocket between the electrode and mounting shell. The method further includes isolating the pocket to prevent detrimental pocket spark induced ignition during operation of the engine.

BRIEF DESCRIPTION OF THE DRAWINGS

The invention will hereafter be described with reference to the accompanying drawings, wherein like reference numerals denote like elements, and:

FIG. 5 is a cross-sectional view taken generally along the axis of the spark plug illustrated in FIG. 4; and FIG. 6 is a bottom view of the spark plug illustrated in FIG. 4.

DETAILED DESCRIPTION OF THE PREFERRED EMBODIMENTS

The present system for inhibiting detrimental ignition effects due to pocket sparking can be utilized in a variety of engines and environments. For the sake of clarity in explanation, however, the invention will be described in conjunction with engines that operate on a two-stroke cycle and utilize fuel injection. The present system and method are particularly amenable for use in two-stroke engines that inject fuel, such as gasoline, directly into each cylinder of the engine. The exemplary embodiment described herein should not be construed as limiting, however, and has potential uses in other types of two-stroke and four-stroke engine applications that may benefit from reduction of ignition problems due to pocket sparking.

Figure 1:
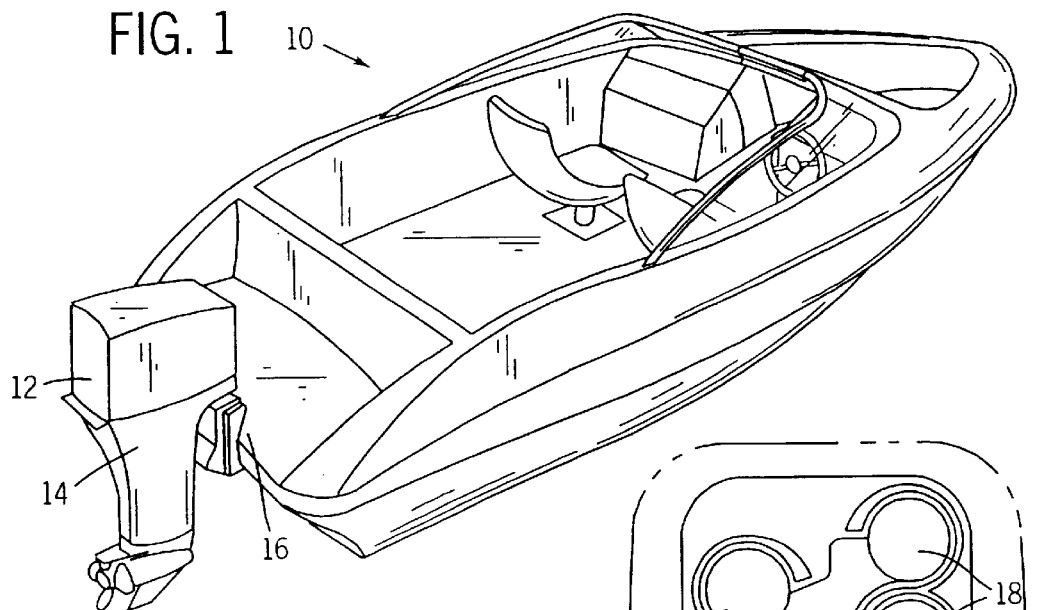
FIG. 1 is a perspective view of a watercraft powered by an exemplary engine incorporating the pocket spark ignition inhibitor system of the present invention.

Referring generally to FIG. 1, an exemplary application of the present system is illustrated. In this application, a watercraft 10, such as a boat, is powered by an engine 12 disposed in an outboard motor 14. In this embodiment, outboard motor 14 is mounted to a transom 16 of watercraft 10. Engine 12 is a two-stroke engine that utilizes direct fuel injection, as explained more fully below.

Figure 2:
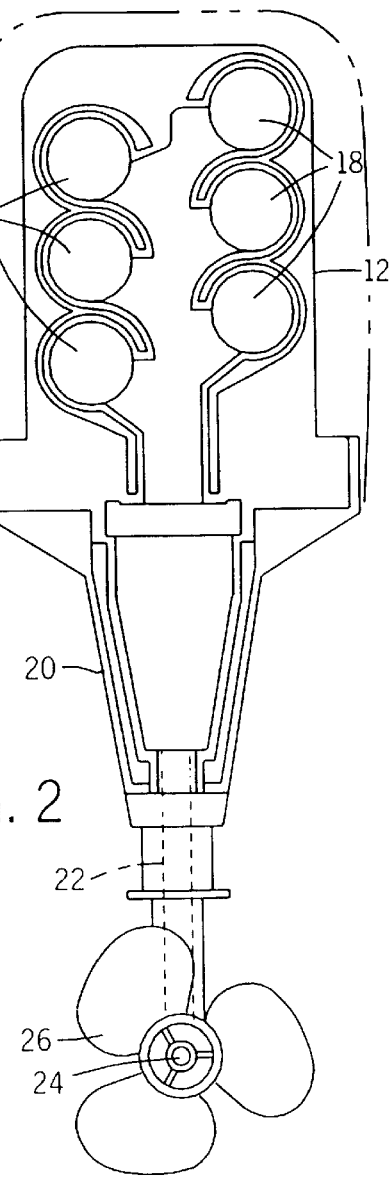
FIG. 2 is a schematic representation of the outboard motor illustrated in FIG. 1.

Although engine 12 may be a single cylinder engine, it often includes a plurality of cylinders 18, as illustrated schematically in FIG. 2. In the application described above, engine 12 is mounted to an outboard motor frame 20 that supports engine 12 and encloses a drive shaft 22. Generally, drive shaft 22 is vertical and connects to an output shaft 24 to which a propeller 26 is mounted. Engine 12 rotates drive shaft 22 which, in turn, rotates output shaft 24. Output shaft 24 is connected to propeller 26 by, for example, splines that rotate the propeller to drive watercraft 10 along the surface of the water. A shroud or housing 28 encloses engine 12.

Figure 3:
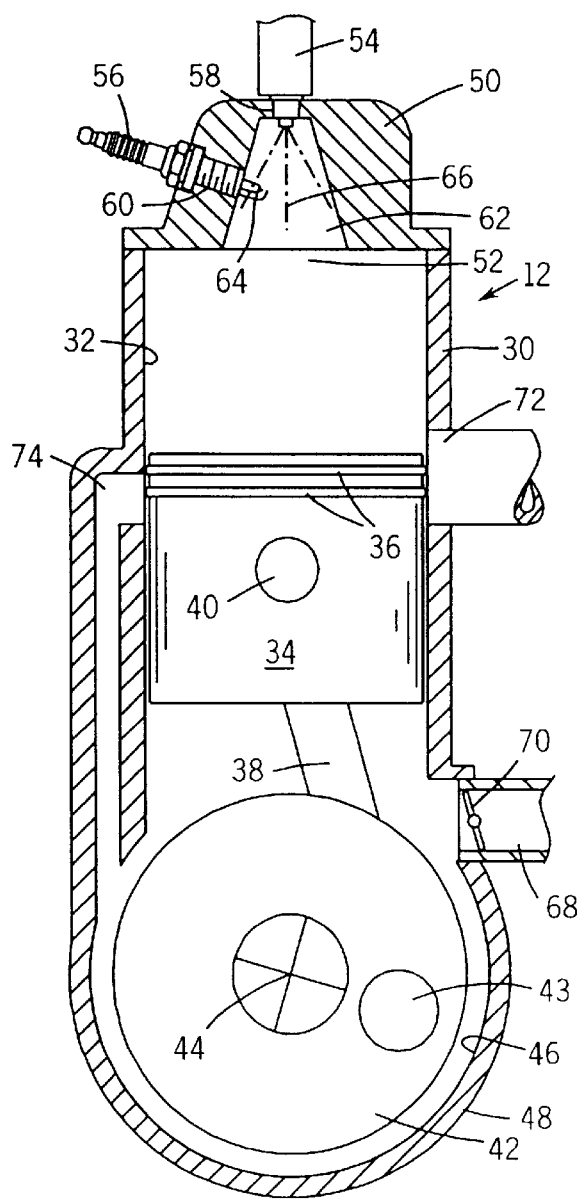
FIG. 3 is a schematic cross-sectional view of a single cylinder in an exemplary two-stroke engine incorporating the pocket spark ignition inhibitor system of the present invention.

Referring generally to FIG. 3, a single cylinder of an exemplary two-stroke engine 12 is illustrated. In this embodiment, engine 12 includes at least one cylinder 30 having an internal cylinder bore 32 through which a piston 34 reciprocates. Piston 34 typically includes one or more rings 36 that promote a better seal between piston 34 and cylinder bore 32 as piston 34 reciprocates within cylinder 30.

Piston 34 is coupled to a connecting rod 38 by a pin 40, sometimes referred to as a wrist pin. Opposite pin 40, connecting rod 38 is connected to a crankshaft 42 at a location 43 offset from a crankshaft central axis 44. Crankshaft 42 rotates about axis 44 in a crankshaft chamber 46 defined by a housing 48.

At an end of cylinder 30 opposite crankshaft housing 48, a cylinder head 50 is mounted to cylinder 30 to define a combustion chamber 52. Cylinder head 50 may be used to mount a fuel injector 54 and a spark plug 56, which are received in a pair of openings 58 and 60, respectively. Openings 58 and 60 may be formed through the wall that forms either cylinder head 50 or cylinder 30. In the illustrated embodiment, openings 58 and 60 are formed through the wall of cylinder head 50 for communication with combustion chamber 52 within a recessed internal region 62 of cylinder head 50.

By way of example, fuel injector 54 may be centrally located at the top of cylinder head 50, as illustrated in FIG. 3. Spark plug 56 preferably is disposed at an angle such that its electrodes 64, and consequently the spark, are positioned in an actual fuel spray pattern 66. Fuel spray pattern 66 is the "cone" or other pattern of fuel spray injected by fuel injector 54.

In operation, piston 34 travels towards cylinder head 50 to compress a charge of air within combustion chamber 52. Simultaneously, fuel injector 54 injects fuel to create a fuel-air mixture that is ignited by an appropriately timed spark across electrodes 64. As piston 34 travels towards cylinder head 50, air is drawn through an inlet port 68 into crankshaft chamber 46 and cylinder 30 on a side of piston 34 opposite combustion chamber 52. A valve 70, such as a reed valve, allows the air to pass into engine 12 but prevents escape back through inlet port 68.

Upon ignition of the fuel-air charge in combustion chamber 52, piston 34 is driven away from cylinder head 50 past an exhaust port 72 through which the exhaust gasses are discharged. As piston 34 moves past exhaust port 72, it ultimately exposes a transfer port 74. Air from crankshaft chamber 46 is forced through port 74 and into cylinder 30 on the combustion chamber side of piston 34. Effectively, the downward travel of piston 34 compresses the air in crankshaft chamber 46 and forces a fresh charge of air into cylinder 30 through transfer port 74 for the next ignition.

This reciprocal motion of piston 34 drives connecting rod 38 and crankshaft 32 to provide power to, for example, drive shaft 22 of outboard motor 14. To provide the desired power to crankshaft 42, it is necessary that ignition of the fuel-air mixture be carefully timed. If the ignition occurs too early, the resultant explosion works against the progress of piston 34 towards cylinder head 50. On the other hand, if ignition is too late, less power is transferred to piston 34. In fact, late ignition often can lead to a detrimental engine operation condition, commonly referred to as "knocking", that can be destructive with respect to engine components.

When spark plug 56 does not produce a spark across electrodes 64 but rather in its recessed pocket formed around the spark plug core nose, a detrimental ignition phenomenon, known as "pocket sparking" occurs. This pocket sparking often creates late combustion or a slow traveling flame front that leads to reduced power and potential engine knocking. Spark plugs in fuel injected engines in which electrodes 64 are located directly in fuel spray pattern 66 are particularly susceptible to pocket sparking. The spray of fuel across the end of spark plug 56 tends to create carbon deposits and other deposits along the core nose of the spark plug. The deposits provide a conductive path along which the ignition current travels instead of arcing between electrodes 64. Ultimately, a spark may occur deep within the pocket of the spark plug between the carbon deposits and the spark plug mounting shell. This, of course, leads to the detrimental late combustion or slow traveling flame front discussed above.

Figure 4:
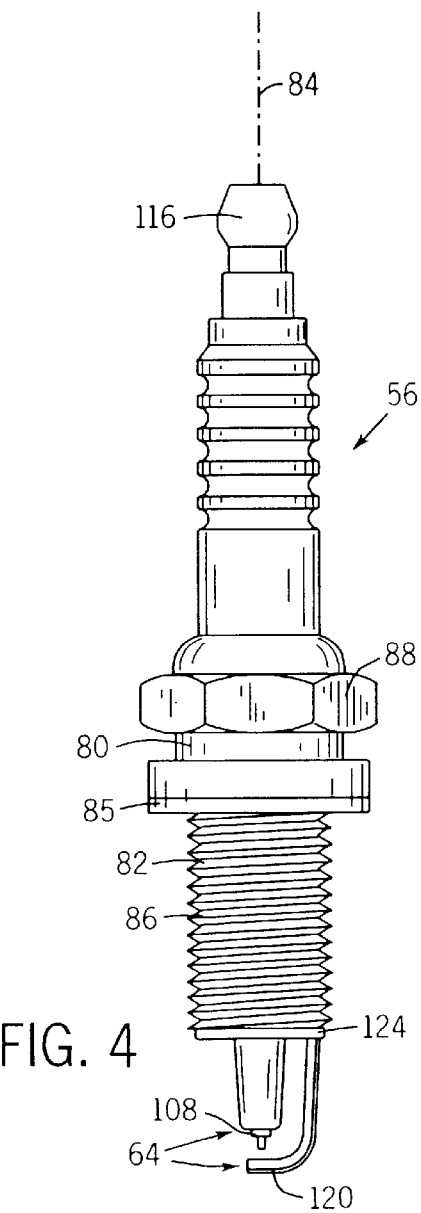
FIG. 4 is an enlarged view of the spark plug illustrated in FIG. 3.

Referring generally to FIGS. 4, 5 and 6, spark plug 56 is illustrated according to an exemplary embodiment of the present invention. In this example, spark plug 56 includes a base 80 formed of a metal material. A mounting shell 82 extends axially from base 80 along a longitudinal axis 84. A sealing washer 85 is disposed about shell 82 adjacent base 80. Mounting shell 82 typically includes a threaded exterior surface 86 designed for threaded engagement with corresponding internal threads within opening 60. Base 80 typically includes a tool engagement region 88, such as a hexagonal section, that may be engaged by a wrench for rotating mounting shell 82 into and out of opening 60.

As illustrated best in FIG. 5, base 80 includes a passage 90 extending therethrough along axis 84. Similarly, mounting shell 82 includes an internal passage 92 that is generally aligned with passage 90. Internal passage 92 is defined by an interior surface 94.

Electrodes 64 include a central electrode 96 that preferably extends along axis 84 through passage 90 and at least partially through internal passage 92 of mounting shell 82. Preferably, central electrode 96 extends a distance 100 beyond an axial terminal end 102 of mounting shell 82. The extension of electrode 96 beyond mounting shell 82 facilitates the placement of a spark directly within the fuel spray pattern 66.

Central electrode 96 is electrically isolated from base 80 and mounting shell 82 by an insulative core 104 that surrounds central electrode 96 and provides an insulating layer between electrode 96 and both base 80 and mounting shell 82. Insulative core 104 also mechanically positions and holds central electrode 96 in base 80, as is known to those of ordinary skill in the art. An exemplary insulative material used for insulative core 104 is ceramic.

In the general area of mounting shell 82, insulative core 104 forms a core nose 106. Typically, core nose 106 tapers radially inward towards central electrode 96 as one moves in a direction from base 80 towards a distal ignition tip 108 of electrode 96. Between an exterior surface 109 of core nose 106 and interior surface 94 of internal passage 92, a pocket 110 is formed. Pocket 110 extends from a pocket base 111 to terminal end 102 of mounting shell 82. In traditional spark plugs, this pocket area became the region responsible for late ignition of the fuel-air mixture in the combustion chamber due to pocket sparking. The spark tended to jump from carbon deposits along exterior surface 109 to interior surface 94 of mounting shell 82 at a location generally towards pocket base 111.

In the embodiment illustrated, central electrode 96 extends beyond insulative core 104 at ignition tip 108 and at an opposing end 112. By way of example, opposing end 112 includes a threaded region 114 to which a cap 116 is threadably engaged. Cap 116 is designed for engagement by a spark plug wire (not shown), as known to those of ordinary skill in the art.

Electrode tip 108, on the other hand, permits the establishment of a spark across a gap 118 formed between tip 108 and a secondary electrode 120 of electrodes 64. When the engine's ignition system applies a sufficient voltage across electrodes 96 and 120, a spark arcs from electrode tip 108 to electrode 120 to ignite the fuel-air mixture in the combustion chamber 52.

Preferably, tip 108 is a tapered tip that may be tapered, for example, by utilizing a step down region 122 in which the diameter of tip 108 is reduced across the step down region 122 to a smaller diameter tip for enhanced spark characteristics.

The detrimental effects of pocket sparking are inhibited by a closure member 124 that substantially encloses pocket 110. In the illustrated embodiment, closure member 124 comprises a lip 126 that extends radially inward from terminal end 102 of mounting shell 82. Lip 126 extends into proximity with the outside surface 109 of core nose 106. A small gap 128, formed between lip 126 and core nose 106, provides the spark an alternative to the gap 118 and encourages arcing to mounting shell 82 at lip 126 rather than at the pocket base 111 of pocket 110. Furthermore, the relatively small gap 128 does not permit the passage of a flame therethrough. Thus, even if sparking occurs within pocket 110, no flame escapes the enclosure to induce late combustion or a slow traveling flame front. This renders the spark plug immune to pocket sparking and engine 12 immune to resultant problems, such as knocking. Closure member 124 may be made from a variety of materials, but it typically is made from a metallic material similar to that of mounting shell 82, as in conventional spark plugs.

It will be understood that the foregoing description is of preferred exemplary embodiments of this invention, and that the invention is not limited to the specific form shown. For example, depending on the specific application, the spark plug may have a variety of electrode and core nose designs. For example, the secondary electrode is typically a J-type electrode, as illustrated in FIG. 5, but it can comprise a variety of other shapes and configurations. Additionally, the length and shape of the core nose may be adjusted according to the type of engine or to the application in which the spark plug is utilized. These and other modifications may be made in the design and arrangement of the elements without departing from the scope of the invention as expressed in the appended claims.

What is claimed is:

1. A fuel injected engine system designed to prevent undesirable ignition characteristics, comprising:
   a two-stroke engine having an internal combustion chamber defined by a wall;
   an injector extending through the wall and into communication with the internal combustion chamber to discharge a fuel spray into the internal combustion chamber; and
   a spark plug having a base; a shell extending from the base and defining a hollow interior; a first electrode coupled to the shell; a second electrode extending through at least a portion of the hollow interior; an insulating layer disposed about the second electrode; and a closure member disposed to extend from the shell into proximity with the insulating layer to prevent the passage of a flame front therethrough, a gap being formed between the closure member and the insulating layer that enables a spark to arc from the closure member to the insulating layer.

2. The fuel injected engine system as recited in claim 1, wherein the second electrode and the insulating layer extend beyond a terminal end of the shell.

3. The fuel injected engine system as recited in claim 1, wherein an enclosed pocket is formed in the hollow interior by the shell, the insulating layer and the closure member.

4. The fuel injected engine system as recited in claim 2, wherein the electrode includes a tip that extends beyond the insulating layer.

5. The fuel injected engine system as recited in claim 4, wherein the tip is generally cylindrical in shape.

6. The fuel injected engine system as recited in claim 4, wherein the tip is a tapered tip having a greater diameter proximate the insulating layer than at a distal end.

7. The fuel injected engine system as recited in claim 6, wherein the tapered tip includes a step forming the transition from the greater diameter to a lesser diameter.

8. A spark plug designed to reduce pocket sparking, comprising:
   a base;
   an insulative core disposed through the base and including a core nose extending axially outwardly from the base;
   a first electrode disposed within the insulative core, the electrode including a tip exposed at a distal end of the core nose;
   a shell connected to the base and having a terminal end, the terminal end being disposed about the core nose less distant from the base than the distal end of the core nose so as to form a pocket between the shell and the core nose;
   a second electrode coupled to the shell; and
   a lip extending inwardly from the terminal end towards the core nose to prevent pocket sparking by preventing the passage of a flame front from the pocket into a cylinder, the lip and the core nose defining a gap to enable a spark to arc from the lip to the core nose.

9. The spark plug as recited in claim 8, wherein the second electrode is a J-type electrode.

10. The spark plug as recited in claim 9, wherein the insulative core comprises a ceramic material.

11. The spark plug as recited in claim 10, wherein the tip is extended beyond the distal end of the core nose.

12. The spark plug as recited in claim 11, wherein the tip is a tapered tip.

13. The spark plug as recited in claim 12, wherein the tapered tip is tapered by reducing the tip diameter through at least one step.

14. A method for reducing undesirable ignition characteristics in a fuel injected engine, comprising:
   injecting a fuel spray into a cylinder of an engine;
   igniting the fuel with a spark plug having an electrode surrounded by a mounting shell that forms a pocket between the electrode and the mounting shell; and
   isolating the pocket with a closure member to prevent detrimental pocket spark induced ignition during operation of the engine from propagating into the cylinder from the pocket and to provide a spark an alternative path to arcing across the pocket.

15. The method as recited in claim 14, wherein injecting includes injecting a fuel spray directly into the cylinder of a two-stroke engine.

16. The method as recited in claim 14, further comprising locating the electrode directly in a fuel spray pattern of the injected fuel.

17. The method as recited in claim 14, further comprising surrounding the electrode with an insulative core.

18. The method as recited in claim 17, wherein isolating comprises connecting an inwardly extending lip to the mounting shell such that the inwardly extending lip extends into proximity with the insulative core.

19. The method as recited in claim 18, further comprising forming the electrode and the insulative core such that the electrode and the insulative core extend axially beyond the mounting shell and the inwardly extending lip.

20. The method as recited in claim 19, further comprising utilizing a tapered tip at a distal end of the electrode.

21. The method as recited in claim 15, further comprising surrounding the electrode with an insulative core.

22. The method as recited in claim 21, wherein isolating comprises connecting an inwardly extending lip to the mounting shell such that the inwardly extending lip extends into proximity with the insulative core.

23. The method as recited in claim 19, further comprising forming the electrode and the insulative core such that the electrode and the insulative core extend axially beyond the mounting shell and the inwardly extending lip.

24. The method as recited in claim 15, further comprising connecting a J-type electrode to the mounting shell.

25. A fuel injected engine system designed to prevent undesirable ignition characteristics, comprising:
   means for injecting a fuel into a cylinder of an engine;
   means for igniting the fuel with a spark plug having an electrode surrounded by a mounting shell that forms a pocket between the electrode and the mounting shell; and
   means for isolating the pocket to prevent detrimental pocket spark induced ignition from propagating into the cylinder from the pocket and to provide a spark an alternative path to arcing across the pocket during operation of the engine.

26. The fuel injected system as recited in claim 25, wherein the means for igniting includes the electrode extending axially beyond the mounting shell.

27. The fuel injected system as recited in claim 25, wherein the means for isolating includes a lip extending radially inward from the mounting shell.

28. The fuel injected system as recited in claim 27, wherein the lip is disposed at a terminal end of the mounting shell.

29. A fuel injected engine system designed to prevent undesirable ignition characteristics, comprising:
   an engine having an internal combustion chamber defined by a wall;
   an injector extending through the wall and into communication with the internal combustion chamber to discharge a fuel spray into the internal combustion chamber; and
   a spark plug having a base; a shell extending from the base and defining a hollow interior; a first electrode coupled to the shell; a second electrode extending through at least a portion of the hollow interior; an insulating layer disposed about the second electrode; and a closure member disposed to extend from the shell into proximity with the insulating layer to prevent the passage of a flame front therethrough, a gap being formed between the closure member and the insulating layer that enables a spark to arc from the closure member to the insulating layer.

30. The fuel injected engine system as recited in claim 29, wherein the second electrode and the insulating layer extend beyond a terminal end of the shell.

31. The fuel injected engine system as recited in claim 29, wherein an enclosed pocket is formed in the hollow interior by the shell, the insulating layer and the closure member.

32. The fuel injected engine system as recited in claim 31, wherein the electrode includes a tip that extends beyond the insulating layer.

33. The fuel injected engine system as recited in claim 32, wherein the tip is generally cylindrical in shape.

34. The fuel injected engine system as recited in claim 33, wherein the tip is a tapered tip having a greater diameter proximate the insulating layer than at a distal end.

35. The fuel injected engine system as recited in claim 34, wherein the tapered tip includes a step forming the transition from the greater diameter to a lesser diameter.

36. A powered watercraft, comprising:
   an engine, wherein the engine includes a spark plug having:
      a base; a shell extending from the base and defining a hollow interior; a first electrode coupled to the shell; a second electrode extending through at least a portion of the hollow interior; an insulating layer disposed about the second electrode; and a closure member disposed to extend from the shell into proximity with the insulating layer to prevent the passage of a flame front therethrough, a gap being formed between the closure member and the insulating layer that enables a spark to arc from the closure member to the insulating layer.

37. The powered watercraft as recited in claim 36, wherein the second electrode and the insulating layer extend beyond a terminal end of the shell.

38. The powered watercraft as recited in claim 36, wherein an enclosed pocket is formed in the hollow interior by the shell, the insulating layer and the closure member.

39. The powered watercraft as recited in claim 38, wherein the electrode includes a tip that extends beyond the insulating layer.

40. The powered watercraft as recited in claim 39, wherein the tip is generally cylindrical in shape.

41. The powered watercraft as recited in claim 40, wherein the tip is a tapered tip having a greater diameter proximate the insulating layer than at a distal end.

42. The powered watercraft as recited in claim 36, wherein the engine is a two-stroke engine.

* * * * *